United States Patent
Wang et al.

(10) Patent No.: US 10,735,310 B2
(45) Date of Patent: Aug. 4, 2020

(54) CONTROLLER, METHOD FOR ADJUSTING FLOW RULE, AND NETWORK COMMUNICATION SYSTEM

(71) Applicant: Industrial Technology Research Institute, Hsinchu (TW)

(72) Inventors: Tzu-Lin Wang, New Taipei (TW); Chih-Kuan Yen, Hsinchu (TW); Yu-Wei Lee, Changhua County (TW); Tzi-Cker Chiueh, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 16/244,111

(22) Filed: Jan. 10, 2019

(65) Prior Publication Data

US 2020/0084138 A1 Mar. 12, 2020

(30) Foreign Application Priority Data

Sep. 6, 2018 (TW) ............... 107131372 A (51) Int. Cl.
*H04L 12/28* (2006.01)
*H04L 12/707* (2013.01)
*H04L 12/721* (2013.01)

(52) U.S. Cl.
CPC .............. *H04L 45/22* (2013.01); *H04L 45/38* (2013.01)

(58) Field of Classification Search
CPC ................................ H04L 45/22; H04L 45/38
USPC .................................................. 370/389, 392
See application file for complete search history.

(56) References Cited

U.S. PATENT DOCUMENTS

| 7,509,408 | B2 * | 3/2009 | Kurita ..................... H04L 67/32 370/229 |
| 7,643,481 | B2 * | 1/2010 | Kadambi ................ H04L 12/46 370/389 |
| 8,677,023 | B2 | 3/2014 | Venkataraghavan et al. |
| 8,953,619 | B2 | 2/2015 | Basso et al. |
| 8,958,427 | B2 | 2/2015 | Basso et al. |
| 9,337,939 | B2 | 5/2016 | Kim et al. |

(Continued)

FOREIGN PATENT DOCUMENTS

| CN | 102880540 | 1/2013 |
| CN | 104714905 | 6/2015 |

(Continued)

OTHER PUBLICATIONS

"Office Action of Taiwan Counterpart Application", dated May 10, 2019, pp. 1-10.

(Continued)

*Primary Examiner* — Chuong T Ho
(74) *Attorney, Agent, or Firm* — JCIPRNET (57) ABSTRACT

The disclosure provides a controller, a method for adjusting packet flow rule, and a network communication system. The method includes: receiving, by a controller, a health status of a first port and a health status of a second port of each of a plurality of hosts in the network communication system; adjusting a packet flow rule of each of the hosts based on the health status of the first port and the health status of the second port of each of the hosts; and transmitting the adjusted packet flow rule of each of the hosts to each of the corresponding hosts to control each of the hosts to transceive a packet according to the corresponding packet flow rule.

30 Claims, 9 Drawing Sheets

(56) References Cited

U.S. PATENT DOCUMENTS

| | | | |
|---|---|---|---|
| 9,734,115 | B2 | 8/2017 | Lee et al. |
| 9,760,455 | B2 | 9/2017 | Lee et al. |
| 10,554,536 | B2* | 2/2020 | Liang ............... H04L 45/306 |
| 2007/0214257 | A1* | 9/2007 | Kurita ............... H04L 69/22 |
| | | | 709/224 |
| 2009/0154469 | A1 | 6/2009 | Winter |
| 2011/0296076 | A1 | 12/2011 | Hu et al. |
| 2012/0072894 | A1 | 3/2012 | Wang et al. |
| 2013/0242987 | A1 | 9/2013 | Basso et al. |
| 2013/0242990 | A1 | 9/2013 | Basso et al. |
| 2013/0346665 | A1 | 12/2013 | Freking et al. |
| 2014/0064056 | A1 | 3/2014 | Sakata et al. |
| 2014/0153568 | A1* | 6/2014 | Gasparakis ......... H04L 5/0058 |
| | | | 370/389 |
| 2015/0023173 | A1 | 1/2015 | Sharma |
| 2016/0105471 | A1* | 4/2016 | Nunes ............ H04L 12/4641 |
| | | | 709/228 |
| 2016/0127480 | A1 | 5/2016 | Rose |
| 2016/0335209 | A1 | 11/2016 | Jau et al. |
| 2017/0026227 | A1* | 1/2017 | Lian ............... H04L 41/0668 |
| 2017/0041248 | A1 | 2/2017 | Toy |
| 2017/0052916 | A1 | 2/2017 | Kollu |
| 2017/0118071 | A1* | 4/2017 | Rasor ............... H04L 41/0672 |
| 2017/0147456 | A1 | 5/2017 | Lee et al. |
| 2017/0257151 | A1 | 9/2017 | Lange |
| 2017/0315957 | A1 | 11/2017 | Aslam et al. |
| 2017/0329735 | A1 | 11/2017 | Garg et al. |
| 2018/0052745 | A1 | 2/2018 | Marripudi et al. |
| 2018/0159759 | A1* | 6/2018 | Liang ................ H04L 45/02 |
| 2018/0176036 | A1 | 6/2018 | Butcher et al. |
| 2018/0367438 | A9* | 12/2018 | Liang ................ H04L 45/50 |
| 2019/0108106 | A1* | 4/2019 | Aggarwal ......... G06F 13/4221 |
| 2019/0109783 | A1 | 4/2019 | Kommula et al. |

FOREIGN PATENT DOCUMENTS

| | | |
|---|---|---|
| CN | 103181133 | 12/2015 |
| CN | 104247341 | 6/2017 |
| TW | I331281 | 10/2010 |
| TW | I598746 | 9/2017 |

OTHER PUBLICATIONS

"Office Action of U.S. Appl. No. 15/849,691", dated Jun. 27, 2019, pp. 1-20.

Venkata Krishnan et al., "A Case Study in I/O Disaggregation using PCI Express Advanced Switching Interconnect (ASI)", Proceedings of the 14th IEEE Symposium on High-Performance Interconnects (HOTI'06), Aug. 2006, pp. 1-7.

Roberto Zambrana, "Inexpensive Optical Ethernet Solutions for High-Reliability, High-Performance and High-Availability Enterprise Networks", eChallenges e-2010 Conference Proceedings, Jan. 2010, pp. 1-9.

Elias Molina et al., "Performance Enhancement of High-Availability Seamless Redundancy (HSR) Networks Using OpenFlow", IEEE Communications Letters, Feb. 2016, pp. 364-367.

Miguel Correia et al., "Development of High-Availability ATCA/PCIe Data Acquisition Instrumentation", IEEE Transactions on Nuclear Science, Jun. 2016, pp. 1620-1624.

Yandong Wang et al., "Lightweight Replication Through Remote Backup Memory Sharing for In-Memory Key-Value Stores", 2017 IEEE 25th International Symposium on Modeling, Analysis, and Simulation of Computer and Telecommunication Systems, Sep. 2017, pp. 53-62.

Akber Kazmi, "PCI Express and Non-Transparent Bridging support High Availability", Embedded Computing Design, Nov. 2004, pp. 1-4.

Dawei Zang, et al., "PROP: Using PCIe-based RDMA to Accelerate Rack-Scale Communications in Data Centers," IEEE ICPADS, Dec. 2015, pp. 465-472.

Takashi Yoshikawa, et al., "Bridge Chip Composing a PCIe Switch over Ethernet to Make a Seamless Disaggregated Computer in Data-Center Scale," Hot Chips 26 Symposium (HCS), IEEE, Aug. 2014, pp. 1.

Jun Suzuki, et al., "ExpressEther—Ethernet-Based Virtualization Technology for Reconfigurable Hardware Platform," IEEE HOTI, Aug. 2006. pp. 1-7.

Venkata Krishnan, et al., "A Case Study in I/O Disaggregation using PCI Express Advanced Switching Interconnect (ASI)," IEEE HOTI, Aug. 2006, pp. 1-7.

Toshihiro Hanawa, et al., "PEARL: Power-aware, Dependable, and High-Performance Communication Link using PCI Express," IEEE CLUSTERWKSP, Dec. 2010, pp. 284-291.

L. Rota, et al., "A PCIe DMA Architecture for Multi-Gigabyte Per Second Data Transmission," IEEE Transactions on Nuclear Science, vol. 62, Issue 3, Jun. 2015, pp. 972-976.

* cited by examiner

CONTROLLER, METHOD FOR ADJUSTING FLOW RULE, AND NETWORK COMMUNICATION SYSTEM

CROSS REFERENCE TO RELATED APPLICATION

This application claims the priority benefit of Taiwan application serial no. 107131372, filed on Sep. 6, 2018. The entirety of the above-mentioned patent application is hereby incorporated by reference herein and made a part of specification.

BACKGROUND OF THE INVENTION

1. Field of the Invention

The disclosure relates to a controller, a method for adjusting a packet flow rule, and a network communication system suitable for combining a peripheral component interconnect express bus and an Ethernet.

2. Description of Related Art

The Peripheral Component Interconnect Express (PCIe) bus is an industrial standard computer extension technology developed by the PCI Special Interest Group (PCI-SIG). PCIe was originally designed as a local bus interconnect technology for connecting CPUs, GPUs, and I/O devices within a machine, and has evolved to become a fully-developed switched networks having features such as point-to-point links, hop-by-hop flow control, end-to-end retransmission. PCIe can also be used as an expansion interface for connecting machines to external devices such as storage boxes.

A PCIe network is a switched network with serial point-to-point full duplex lanes. A PCIe device connects to this PCIe network through a link consisting of one or more channels. Recently, an extended PCIe that interconnects multiple servers or virtualized I/O devices using the PCIe interface has become a standard. For example, PCIe applications can be further extended to intra-rack interconnects. PCIe switches can be used to replace standard top of rack (ToR) Ethernet switches, that is, PCIe can connect multiple hosts (such as servers) in the same rack and it also connect to PCIe switches. Input/Output (I/O) devices to share all servers in the same rack. All servers in the rack can also communicate with each other through PCIe links.

In addition, in order to make the hybrid network architecture having PCIe based Ethernet over PCIe (EoP) and Ethernet network be able to carry out intra-rack/inter-rack packet transmission, a controller in the art (U.S. patent application Ser. No. 15/849,691) has been proposed to arrange the packet transmissions between the hosts in the same/different racks while avoiding broadcast storms. Roughly speaking, based on the flow rules which the controller modified, the hosts can transmit or receive a packet through a network interface card. If the packet is unicast, the packet is transmitted/received through the EoP port for the transmissions within the same rack or transmitted/received through the Ethernet port for the transmissions among different racks.

However, if the EoP port or Ethernet port of a host fails, the host will not be able to correctly perform intra-rack/inter-rack packet transmission/reception.

SUMMARY OF THE INVENTION

Accordingly, the present disclosure provides a controller, a method for adjusting a packet flow rule, and a network communication system, which can be used to solve the above technical problem.

The disclosure provides a controller for a network communication system that combines a peripheral component interconnect express bus with an Ethernet, wherein the network communication system further includes a plurality of hosts. The controller includes a storage circuit and a processor. The storage circuit stores a plurality of modules. The processor is coupled to the storage circuit and accesses the modules to perform the following steps: receiving a health status of a first port and a health status of a second port of each of the hosts; adjusting a packet flow rule of each of the hosts according to the health status of the first port and the health status of the second port of each of the hosts; and transmitting the adjusted packet flow rule of each of the hosts to each of the corresponding hosts to control each of the hosts to transceive a packet according to the corresponding packet flow rule.

The disclosure provides a method for adjusting a packet flow rule is applicable to a controller in a network communication system that combines a peripheral component interconnect express bus and an Ethernet, wherein the network communication system further includes a plurality of hosts. The method includes: receiving a health status of a first port and a health status of a second port of each of the hosts; adjusting a packet flow rule of each of the hosts according to the health status of the first port and the health status of the second port of each of the hosts; and transmitting the adjusted packet flow rule of each of the hosts to each of the corresponding hosts to control each of the hosts to transceive a packet according to the corresponding packet flow rule.

The disclosure provides a network communication system suitable for combining a peripheral component interconnect express bus with an Ethernet. The network communication system includes a plurality of hosts and a controller. The controller is configured to: receive a health status of a first port and a health status of a second port of each of the hosts; adjust a packet flow rule of each of the hosts according to the health status of the first port and the health status of the second port of each of the hosts; and transmit the adjusted packet flow rule of each of the hosts to each of the corresponding hosts to control each of the hosts to transceive a packet according to the corresponding packet flow rule.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
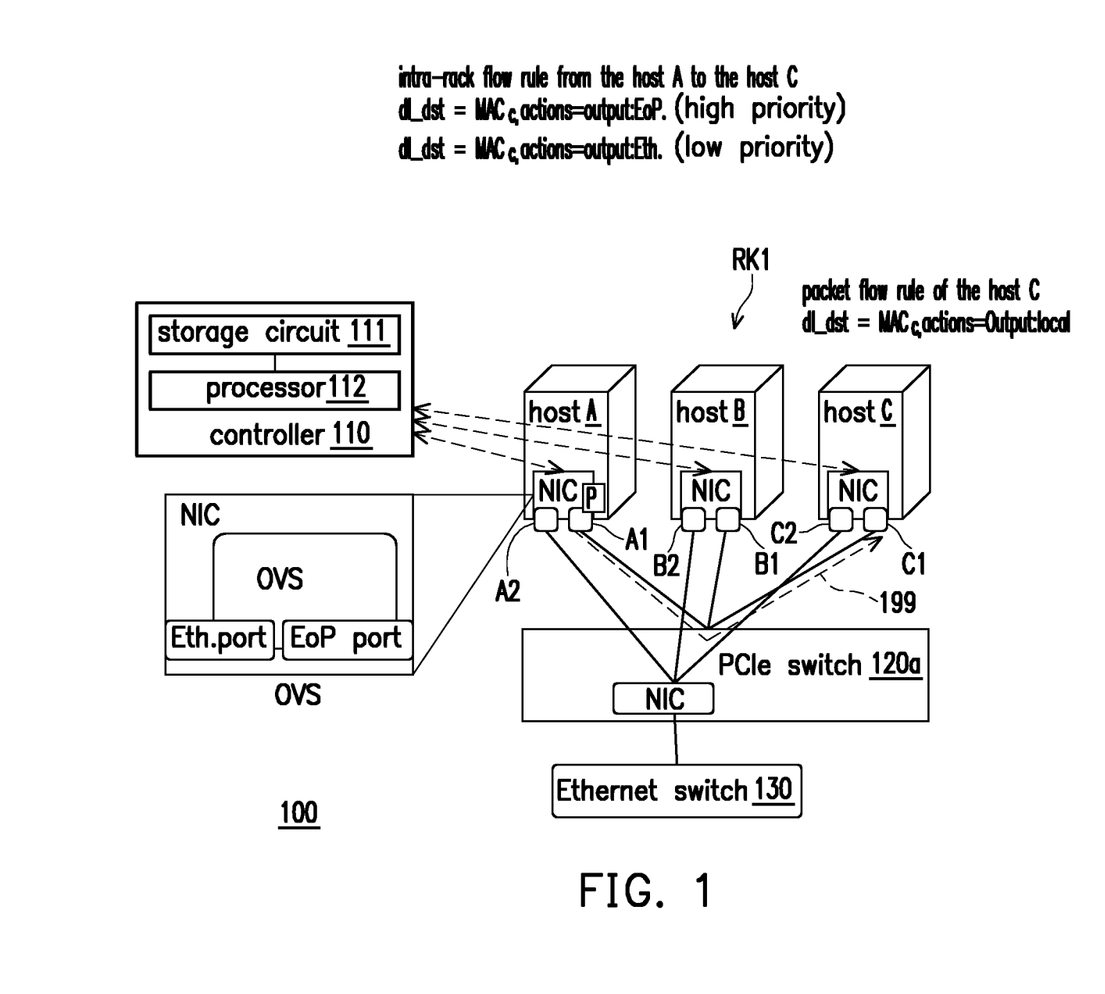
FIG. 1 is a schematic diagram of a network communication system capable of performing intra-rack communications according to an embodiment of the disclosure.

Please refer to FIG. 1, which is a schematic diagram of a network communication system capable of performing intra-rack communications according to an embodiment of the disclosure. In the present embodiment, the network communication system 100 includes a controller 110, hosts A, B, C, a PCIe switch 120a, and an Ethernet switch 130.

The controller 110 includes a storage circuit 111 and a processor 112. The storage circuit 111 is, for example, a memory, a hard disk, or any other component that can be used to store data, and can be used to record or store a plurality of modules, wherein each module is composed of one or more code segments. The processor 112 is coupled to the storage circuit 111, and can respectively perform the steps of the method for adjusting the packet flow rule proposed by the present disclosure by accessing the modules in the storage circuit 111. In various embodiments, the processor 112 can be a general purpose processor, a special purpose processor, a conventional processor, a digital signal processor, a plurality of microprocessors, one or more microprocessor combined with multi-core digital signal processors, microcontroller, Application Specific Integrated Circuit (ASIC), Field Programmable Gate Array (FPGA), any other kind of integrated circuit, state Machines, based on Advanced RISC Machine (ARM) processors and the like.

The hosts A, B, and C may be servers or virtual servers in the same rack RK1. The host A may include a first port A1 and a second port A2, the host B may include a first port B1 and a second port B2, and the host C may include a first port C1 and a second port C2. For ease of the following discussions, it will be assumed that the first and second ports of each of the hosts A, B, and C may be, for example, an EoP port and an Ethernet port (hereinafter referred to as Eth. port). In addition, the EoP port of each of the hosts A, B, and C can be connected to the PCIe switch 120a, and the Eth. port of each of the hosts can be connected to the NIC (not labeled) in the PCIe switch 120a.

In the present embodiment, the EoP port of each of the hosts A, B, and C is, for example, a connecting port of a memory mapping system implemented by software or a physical connecting port. It is worth noted that EoP port and Eth. port of each of the hosts A, B, and C can be combined into a Network Interface Card (NIC) by software modules or program codes. Based on this, the NIC can be a virtual switch (OpenvSwitch, OVS), a driver module, or other various software and hardware modules.

The controller 110 is network connected to the NICs of the hosts A, B, and C, and the NICs of the hosts in other racks, thereby monitoring the hosts in the rack and outside the rack in real time. Specifically, a management network is formed between the controller 110 and the hosts of each of the racks, and this network is completely independent from the network between the hosts. It should be noted that the controller 110 may be disposed in the rack, in the host, or outside the rack, but the disclosure is not limited thereto. The PCIe switch 120a is network connected to the Ethernet switch 130. The PCIe switch 120a is configured to process the propagation in the rack RK1, and can transmit packets to the hosts in other racks through the Ethernet switch 130 or receive packets from the hosts in other racks. In various embodiments, the PCIe switch 120a may be disposed in the rack RK1, in the host, or outside the rack RK1, but the disclosure is not limited thereto.

In FIG. 1, the NICs of each of the hosts A, B, and C may have at least one packet flow rule table, such that each NIC may transmit or receive packets according to rules within the packet flow rule table. In the embodiment of the present disclosure, one or more packet flow rules in the packet flow rule table of the NICs in each of the hosts A, B, and C may be configured by the controller 110 and stored in the storage circuit 111 of the controller 110. Also, the mechanism by which the controller 110 issues and updates the packet flow rules for each of the hosts A, B, C can be referred to U.S. patent application Ser. No. 15/849,691, the disclosure of which is incorporated herein by reference.

In different embodiments, the packet flow rules stored in the NICs of the hosts A, B, and C may include intra-rack flow rules and inter-rack flow rules.

For example, in order to facilitate the intra-rack communication between the host A and the host C located in the same rack RK1, the NIC of the host A can store two intra-rack flow rules "dl_dst=$MAC_C$, actions=output: EoP (high priority)" and "dl_dst=$MAC_C$, actions=output: Eth. (low priority)" as shown in FIG. 1. The two intra-rack flow rules mean that if the destination medium access control (MAC) address of the packet P is the MAC address of the host C (i.e., $MAC_C$), among the EoP port (i.e., the first port A1) having the higher priority and the Eth. port (i.e., the second port A2) having the lower priority, the host A will preferentially send the packet P to the PCIe switch 120a via the EoP port to let the PCIe switch 120a assist in forwarding the packet P to the host C. In other embodiments, if the first port A1 (i.e., the EoP port) of the host A cannot be used for transmission for some reason, the host A will use the second port A2 (i.e., the Eth. port) with lower priority to send the packet P to the NIC of the PCIe switch 120a according to the above-mentioned intra-rack flow rule, such that the packet P may be forwarded to the host C by the NIC of the PCIe switch 120a.

Similarly, the NICs of the hosts B and C may also store rules similar to those in the above-mentioned intra-rack flow rules, so that when the hosts B and C want to transmit packets to other hosts located in the same rack RK1, the EoP port with higher priority may be used to send the packets.

In addition, the packet flow rule of "dl_dst=$MAC_C$, actions=Output:local" as shown in FIG. 1 may be stored in the NIC of the host C, which means that if the packet P whose destination MAC address is $MAC_C$ is received, the packet P will be outputted by the local port of the host C (i.e., keeping the aforementioned packet in the host C).

Therefore, if the host A wants to transmit the packet P to the host C, the host A can send the packet P to the PCIe switch 120a through the first port A1 (i.e., the EoP port), and let the PCIe switch 120a forward the packet P to the first port C1 of the host C, and the transmission path of the packet P may be illustrated as the transmission path 199.

Figure 2:
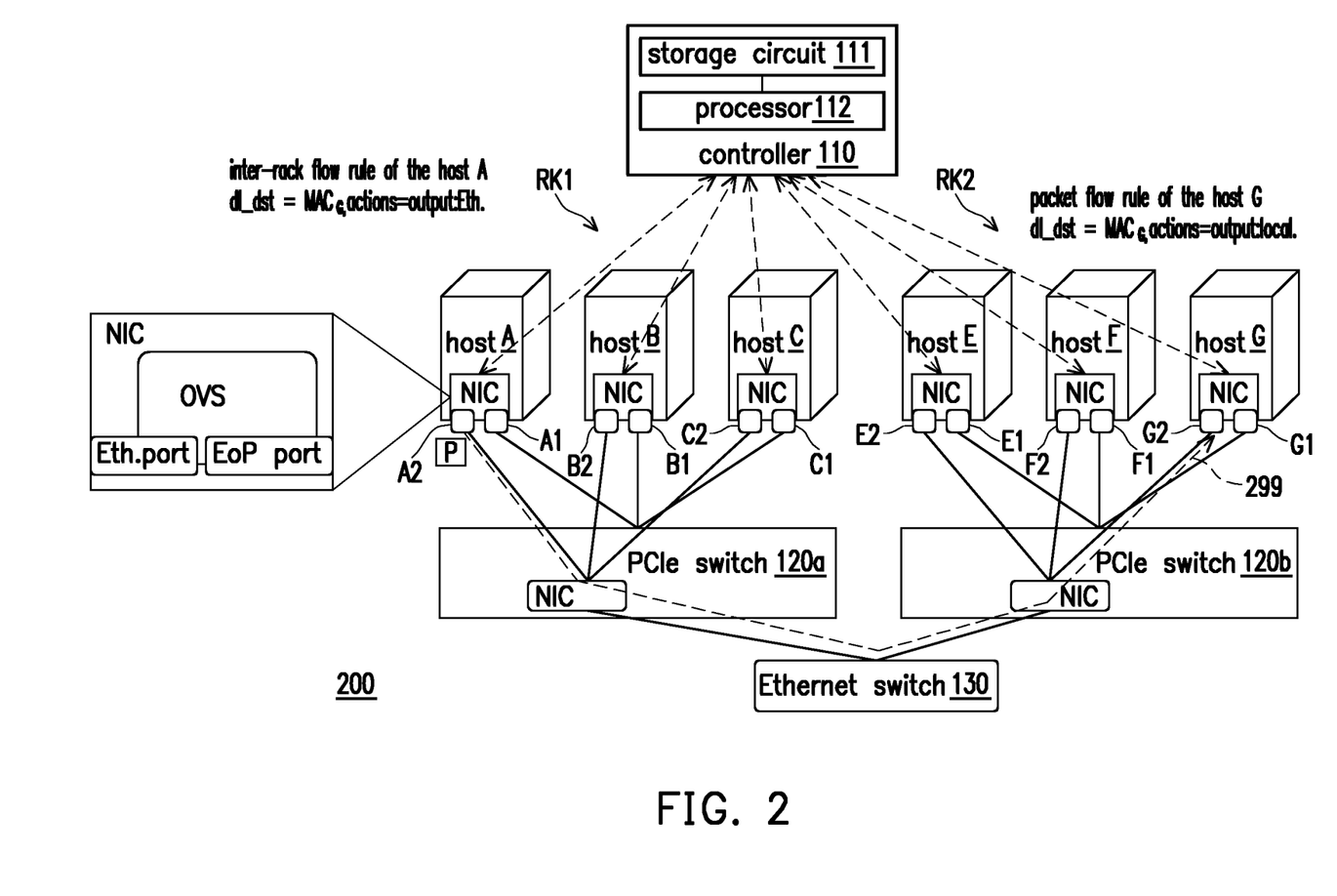
FIG. 2 is a schematic diagram of a network communication system capable of inter-rack communication according to an embodiment of the disclosure.

Please refer to FIG. 2, which is a schematic diagram of a network communication system capable of inter-rack communication according to an embodiment of the disclosure. In the present embodiment, the network communication system 200 includes a controller 110, hosts A, B, C, E, F, G, PCIe switches 120a, 120b, and an Ethernet switch 130. The connection relationship and operation mode of the controller 110, the host A, the B, the C, the PCIe switch 120a, and the Ethernet switch 130 in FIG. 2 are the same as those in FIG. 1, and details are not repeated herein.

The hosts E, F, and G may be servers or virtual servers in the same rack RK2. The host E may include a first port E1 and a second port E2, the host F may include a first port F1 and a second port F2, and the host G may include a first port G1 and a second port G2. For ease of the following discussions, it will be assumed below that the first and second ports of each of the hosts E, F, G can be, for example, EoP port and Eth. port, respectively. In addition, the EoP port of each of the hosts E, F, G can be connected to the PCIe switch 120b, and the Eth. port of each of the hosts E, F, G can be connected to the NIC (not labeled) in the PCIe switch 120b.

In the present embodiment, the EoP port of each of the hosts E, F, and G is, for example, a connecting port of a memory mapping system implemented by software or a physical connecting port. Moreover, similar to the hosts A, B, C, the EoP port and Eth. port of each of the hosts E, F, G can be combined into a Network Interface Card (NIC), and the NIC can be a virtual switch (OpenvSwitch, OVS), a driver module, or other various software and hardware modules.

As shown in FIG. 2, in addition to being network connected to the NICs of the hosts A, B, and C located in the rack RK1, the controller 110 can also be network connected to the NICs of the hosts E, F, and G located in the rack RK2, and monitor the hosts in the rack RK1, RK2 or other racks in real-time. The PCIe switch 120b is network connected to the Ethernet switch 130. The PCIe switch 120b is configured to process the propagation in the rack RK2 and can transmit packets to the hosts A, B, and C located in the rack RK1 or receive packets from the hosts A, B, and C located in rack RK1 through the Ethernet switch 130. In various embodiments, the PCIe switch 120b may be disposed in the rack RK2, in the host, or outside the rack RK2, but the disclosure is not limited thereto.

In FIG. 2, the NICs of each of the hosts E, F, G may have at least one packet flow rule table to enable each NIC to transmit or receive packets according to rules within the packet flow rule table. In the embodiment of the present disclosure, one or more packet flow rules in the packet flow rule table of the NICs in each of the hosts E, F, G may also be configured by the controller 110.

In different embodiments, the packet flow rules stored in the NICs of the hosts E, F, and G may include intra-rack flow rules and inter-rack flow rules.

For example, in order to facilitate the intra-rack communication between the host E and the host G located in the same rack RK2, the NIC of the host E can store two intra-rack flow rules "dl_dst=$MAC_G$, actions=output: EoP (high priority)" and "dl_dst=$MAC_G$, actions=output: Eth. (low priority)". The two intra-rack flow rules mean that if the destination MAC address of the packet P is the MAC address of the host G (i.e., $MAC_G$), among the EoP port (i.e., the first port E1) having the higher priority and the Eth. port (i.e., the second port E2) having the lower priority, the host E will preferentially send the packet P to the PCIe switch 120b via the EoP port to let the PCIe switch 120b assist in forwarding the packet P to the host G. In other embodiments, if the first port E1 (i.e., the EoP port) of the host E cannot be used for transmission for some reason, the host E will use the second port E2 (i.e., the Eth. port) with lower priority to send the packet P to the NIC of the PCIe switch 120b according to the above-mentioned intra-rack flow rule, such that the packet P may be forwarded to the host G by the NIC of the PCIe switch 120b.

Similarly, the NICs of the hosts F and G may also store rules similar to the above-mentioned intra-rack flow rules, so that the host F or the host G may preferentially use EoP port to send packets when transmitting packets to other hosts located in the same rack RK2.

In addition, as shown in FIG. 2, in order to facilitate the inter-rack communication between the host A (located in the rack RK1) and the host G (located in the rack RK2), the inter-rack flow rule of "dl_dst=$MAC_G$, actions=output: Eth." may also be stored in the host A. It means that if the destination MAC address of the packet P is the MAC address of the host G (i.e., $MAC_G$), the host A may send the packet P to the NIC of the PCIe switch 120a via the Eth. port (i.e., the second port A2), such that the packet P may forwarded by the NIC of the PCIe switch 120a.

Similarly, the NICs of the hosts B, C, E, F, and G may also store rules similar to the inter-rack flow rules, so that when each of the hosts B, C, E, F, and G wants to transmit packets to other hosts in another rack, the Eth. port can be used.

In addition, the NIC of the host G can store a packet flow rule of "dl_dst=$MAC_G$, actions=Output: local" as shown in FIG. 2, which means that if the packet P whose destination MAC address is $MAC_G$ is received, the packet P may be outputted by the local port of the host G (i.e., keeping the packet P in the host G).

Therefore, if the host A wants to transmit the packet P to the host G, the host A can send the packet P to the NIC of the PCIe switch 120a through the second port A2 (i.e., the Eth. port), and the NIC of the PCIe switch 120a may forward the packet P to the second port G2 (i.e., Eth. port) of the host G via the NIC of the Ethernet switch 130 and the PCIe switch 120b. The transmission path of the packet P can be illustrated as the transmission path 299.

It can be known from the above teachings that the first port (i.e., the EoP port) of each of the hosts in the disclosure is preset for intra-rack communications, and the second port (i.e., the Eth. port) of each of the hosts is preset for inter-rack communications, but the disclosure is not limited thereto.

However, when any port of a host in the network communication system 200 fails, the host will not be able to correctly perform intra-rack/inter-rack packet transmission/reception.

In view of this, the present disclosure proposes a method for adjusting a packet flow rule to solve the above drawbacks of the prior art, and is specifically described below.

Figure 3:
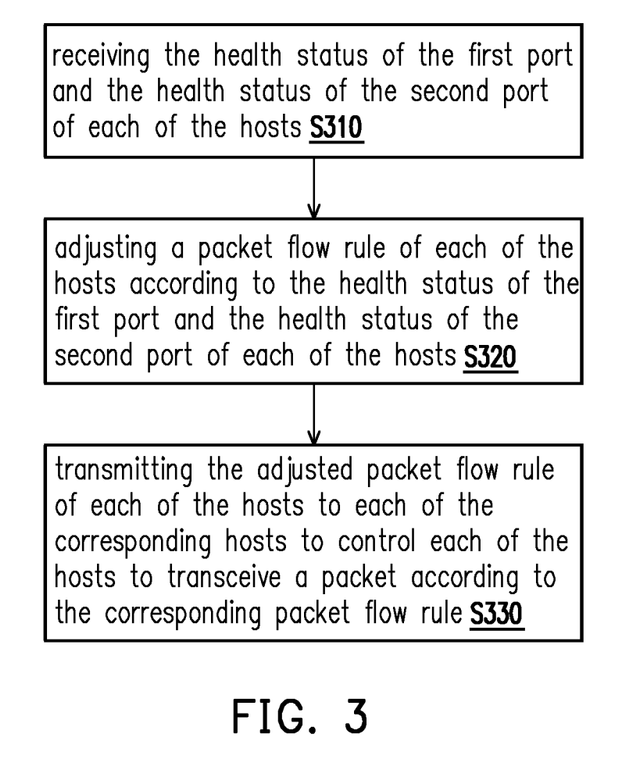
FIG. 3 is a method for adjusting a packet flow rule according to an embodiment of the disclosure.

Please refer to FIG. 3, which is a method for adjusting a packet flow rule according to an embodiment of the disclosure. The method of this embodiment can be performed by the controller 110 of FIGS. 1, 2, which includes the following steps. Step S310: the processor 112 can receive the health status of the first port and the health status of the second port of each of the hosts; Step S320: the processor 112 can adjust a packet flow rule of each of the hosts according to the health status of the first port and the health status of the second port of each of the hosts; Step S330: the processor 112 may transmit the adjusted packet flow rule of each of the hosts to each of the corresponding hosts to control each of the hosts to transceive a packet according to the corresponding packet flow rule.

In order to make the concept of each step of FIG. 3 clearer, a more detailed description will be made below based on FIGS. 4A, 4B, 5A, 5B, 5C, and 5D. In the following embodiments, each of the hosts in the network communication system may periodically check the health status of the first port (i.e., the EoP port) and the health status of the second port (i.e., the Eth. port). If the status of the port is changed, the hosts will notify controller 110, such that the controller may be aware of whether the first port and the second port of each of the hosts can operate normally to perform transmission/reception of the packets.

Figure 4A:
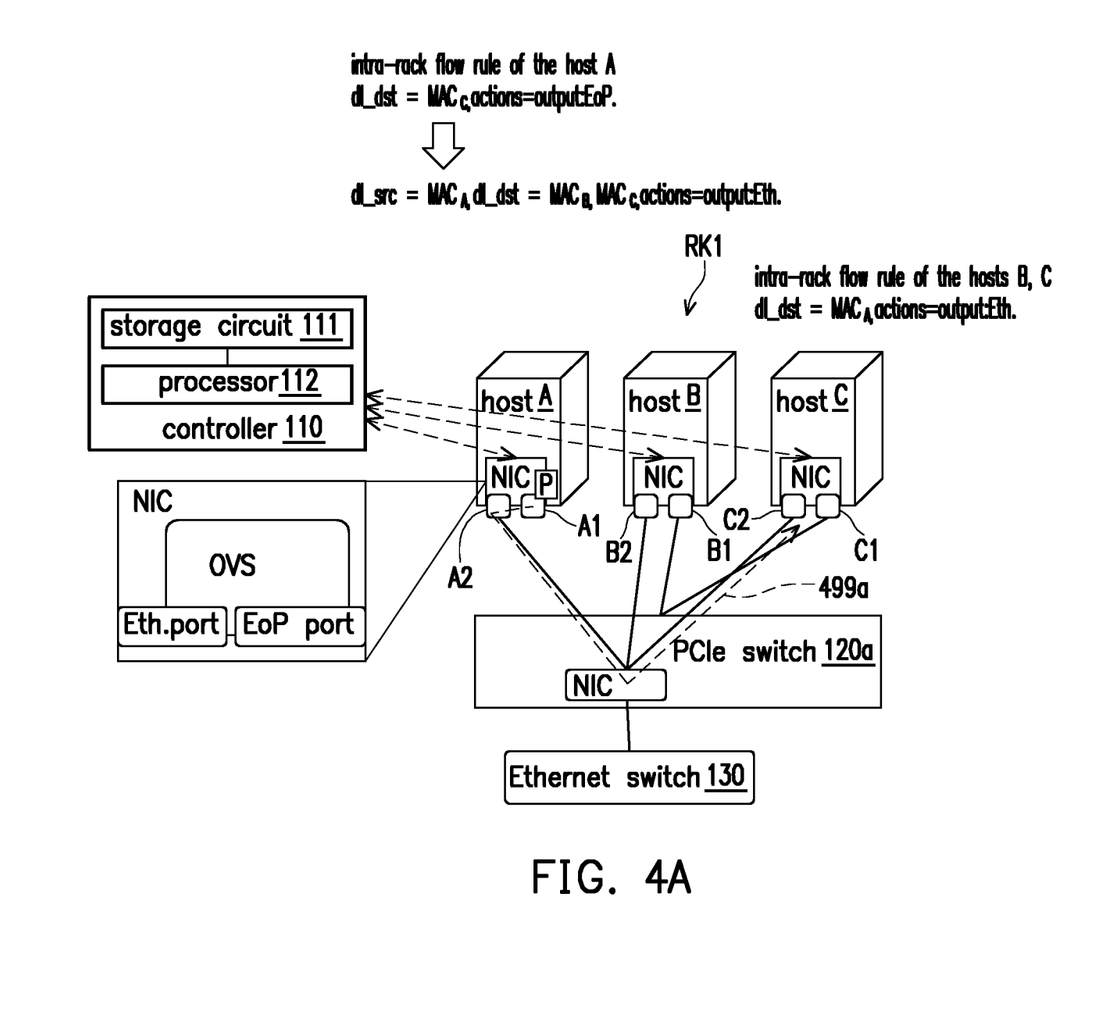
FIG. 4A is a schematic diagram of adjusting intra-rack flow rules when the first port of the transmitting host fails according to FIG. 1.

Please refer to FIG. 4A, which is a schematic diagram of adjusting intra-rack flow rules when the first port of the transmitting host fails according to FIG. 1. In this embodiment, if the first port A1 (i.e., the EoP port) of the host A fails, the controller 110 can learn from the information reported by the host A by performing step S310 of FIG. 3. Accordingly, the processor 112 may perform step S320 to adjust the packet flow rules of the hosts A, B, and C.

Specifically, since the first port A1 of the host A cannot be used for intra-rack communication, if the host A wants to transmit the packet P to the host C, the processor 112 can modify the intra-rack flow rule "dl_dst=$MAC_C$, actions=output:EoP" (also known as a first intra-rack flow rule) originally stored in the host A to be "dl_src=$MAC_A$, dl_dst=anyhost, actions=output:Eth." as shown in FIG. 4A, and the adjusted intra-rack flow rule may be sent to the host A in step S330. In this case, if the host A wants to send the packet P to any host in rack RK1, the host A will send the packet P to the PCIe switch 120a via the second port A2 (i.e., the Eth. port) to let the PCIe switch 120a forward the packet P. For example, suppose the host A wants to send the packet P to the host C (i.e., the source MAC address of the packet P is $MAC_A$ and the destination host MAC address is $MAC_C$), the host A will transmit the packet P via the second port A2 (i.e., the Eth. port) to the NIC of the PCIe switch 120a to forward the packet P to the second port C2 of the host C via the PCIe switch 120a. The transmission path of the packet P can be illustrated as a transmission path 499a.

In addition, for the other hosts B and C of the rack RK1, since the first port A1 of the host A cannot be used to receive packets due to the failure, the processor 112 may also modify the intra-rack flow rules of the hosts B and C to be "dl_dst=$MAC_A$, actions=output: Eth." (also referred to as a second intra-rack flow rule) as shown in FIG. 4A in step S320. The adjusted intra-rack flow rule can be sent to the hosts B, C in step S330. In this case, if the hosts B, C want to send packets to the host A, the hosts B, C will send the packets to the PCIe switch 120a by its Eth. port, such that the packets may be forwarded to the second port A2 (i.e., the Eth. port) of the host A through the PCIe switch 120a.

Figure 4B:
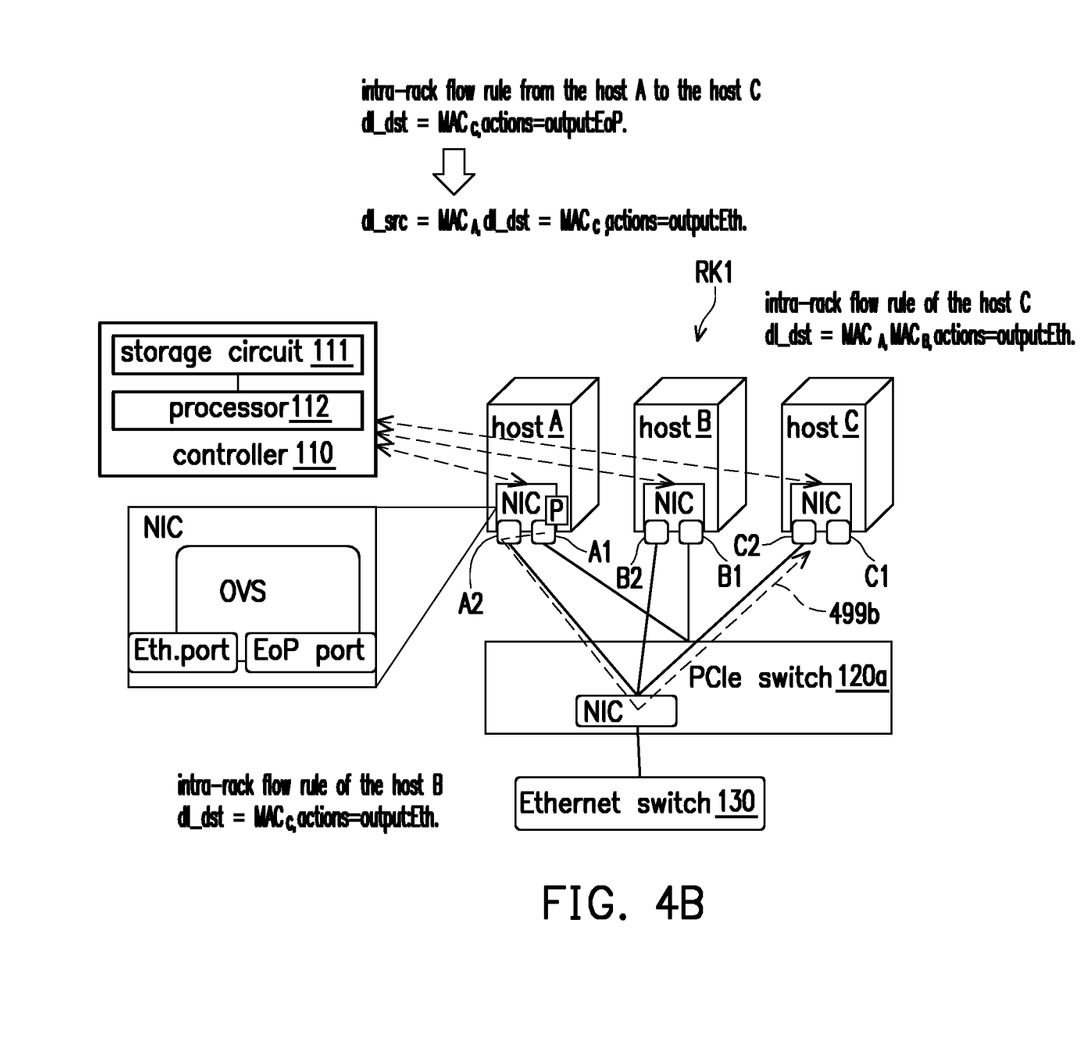
FIG. 4B is a schematic diagram of adjusting intra-rack flow rules when the first port of the receiving host fails according to FIG. 1.

Please refer to FIG. 4B, which is a schematic diagram of adjusting intra-rack flow rules when the first port of the receiving host fails according to FIG. 1. In this embodiment, if the first port C1 (i.e., the EoP port) of the host C fails, the controller 110 can learn from the information reported by the host C by performing step S310 of FIG. 3. Accordingly, the processor 112 may perform step S320 to adjust the packet flow rules of the hosts A, B, and C.

Specifically, since the first port C1 of the host C is no longer available for intra-rack communication, the processor 112 can modify the intra-rack flow rule of the "dl_dst=$MAC_C$, actions=output: EoP" originally stored in the host A to be "dl_src=$MAC_A$, dl_dst=$MAC_C$, actions=output: Eth." as shown in FIG. 4B, and the adjusted intra-rack flow rule can be transmitted to the host A in step S330. In this case, if the host A wants to send the packet P to host C (i.e., the source MAC address of packet P is $MAC_A$ and the destination MAC address is $MAC_C$), the host A will send the packet P via the second port A2 (i.e., the Eth. port) to the NIC of the PCIe switch 120a to forward the packet P to the second port C2 (i.e., the Eth. port) of the host C through the NIC of the PCIe switch 120a. The transmission path of the packet P can be illustrated as a transmission path 499b.

In addition, for the host B, since the first port C1 of the host C cannot be used to receive packets due to the failure, the processor 112 may also modify the intra-rack flow rule of the host B to "dl_dst=$MAC_C$, actions=output: Eth." as shown in FIG. 4B in step S320, and the adjusted intra-rack flow rule can be sent to the host B in step S330. In this case, if the host B wants to send the packet to the host C, the host B will send the packet via the second port B2 (i.e., the Eth. port) to forward the packet to the second port C2 of the host C through the NIC of the PCIe switch 120a.

Furthermore, the processor 112 can modify the intra-rack flow rule of the host C to "dl_dst=$MAC_A$, $MAC_B$, actions=output: Eth." as shown in FIG. 4B, and can send the adjusted intra-rack flow rule to the host C in step S330. In this case, if the host C wants to send a packet to any other host in the rack RK1, the host C will send the packet via the second port C2 (i.e., the Eth. port) to the NIC of the PCIe switch 120a, such that the packet may be forwarded by the NIC of PCIe switch 120a.

It can be known from the above teachings that when the first port (i.e., the EoP port) preset to perform intra-rack communications of a certain host has failed, the controller 110 can maintain well-functioned intra-rack communications among the hosts in the same rack by modifying the intra-rack flow rules of all hosts in the rack to instruct all hosts in the rack to perform packet transmissions via the second port (i.e., the Eth. port) of each of the hosts.

Figure 5A:
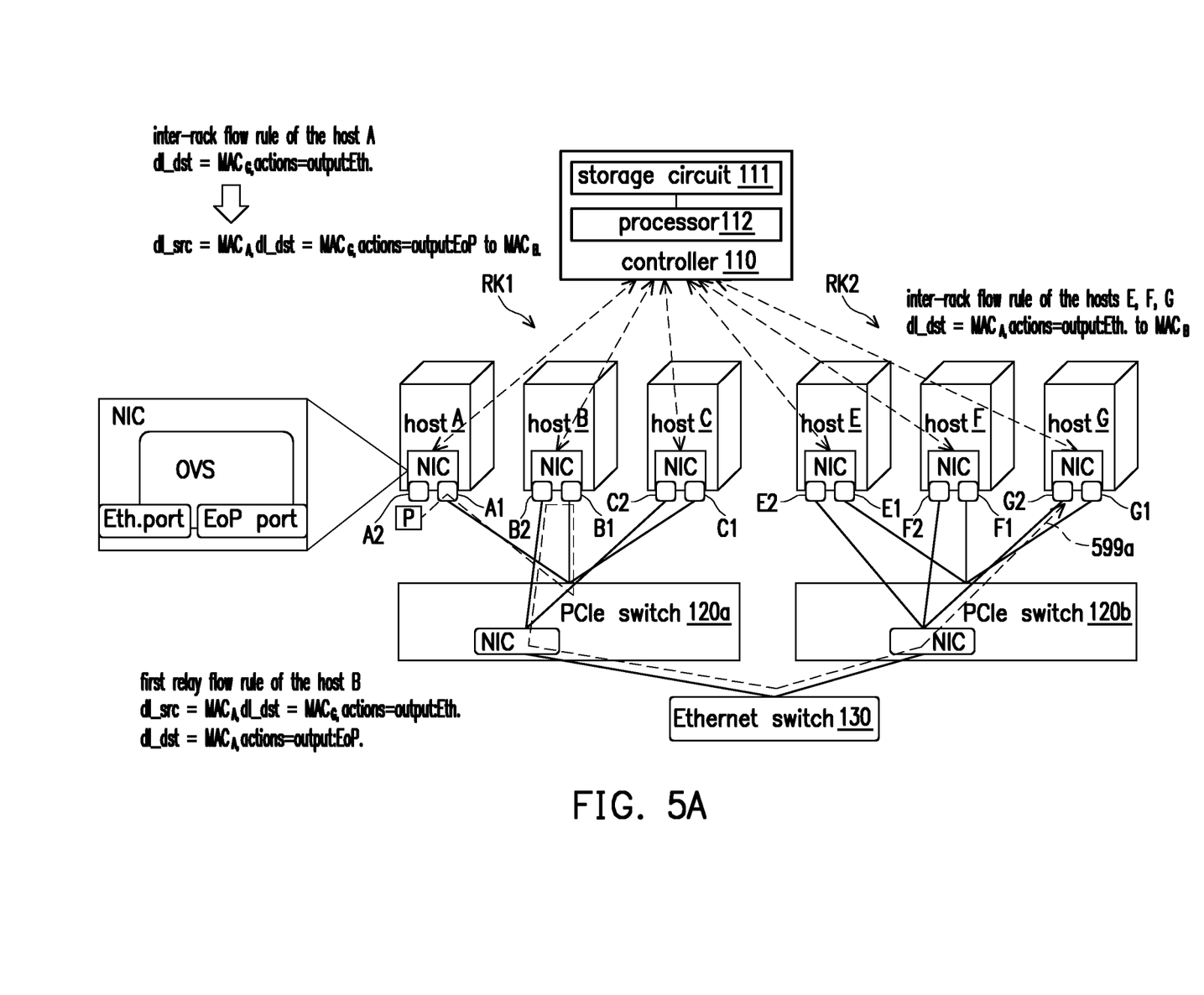
FIG. 5A is a schematic diagram of adjusting inter-rack flow rules when the second host of the transmitting host fails according to FIG. 2.

Please refer to FIG. 5A, which is a schematic diagram of adjusting inter-rack flow rules when the second host of the transmitting host fails according to FIG. 2. In this embodiment, assuming that the second port A2 of the host A (i.e., the Eth. port) fails, the controller 110 can learn from the information reported by the host A by performing step S310 of FIG. 3. Accordingly, the processor 112 may perform step S320 to adjust the packet flow rules of the hosts A, B, C in the rack RK1 and the hosts E, F, and G in the rack RK2.

In particular, since the second port A2 of the host A is no longer available for inter-rack communications, the processor 112 can select the first relay host from the hosts B, C also located in the rack RK1. In one embodiment, the processor 112 may select any of the hosts B and C as the first relay host, wherein the first port and the second port of the first relay host need to be normally functioned. In another embodiment, the processor 112 may select one of the hosts B, C having the minimum load and/or the minimum transmission delay as the first relay host, but the disclosure is not be limited thereto. In one embodiment, the OVS of any host may count the number of packets passing through the first port and the number of packets passing through the second port in a preset time interval, sum the two numbers of the packets to characterize the traffic load of the host in the preset time interval, and provide the summed number to the controller 110 as a reference for selecting the first relay host.

After selecting the first relay host, the processor 112 may set a first relay flow rule for the first relay host to assist the host A to perform an inter-rack communication with any host in the rack RK2.

Then, the processor 112 can modify the inter-rack flow rule of the host A and the inter-rack flow rule of any host in the rack RK2 to respectively control the host A and any host in the rack RK2 to perform the inter-rack communication according to the inter-rack flow rule of the host A and the inter-rack flow rule of any host in the rack RK2 under the assistance of the first relay host using the first relay flow rule.

For ease of the following discussions, it is assumed that the host B is selected as the first relay host, but the disclosure is not limited thereto. If the host A wants to transmit the packet P to the host G, the processor 112 may modify, in step S320, the inter-rack flow rule of the "dl_dst=$MAC_G$, actions=output: Eth." originally stored in the host A to be "dl_src=$MAC_A$, dl_dst=$MAC_G$, actions=output: EoP to $MAC_B$." as shown in FIG. 5A and modify the first relay flow rule of the first relay host (i.e., the host B) to be "dl_src=$MAC_A$, dl_dst=$MAC_G$, actions=output: Eth." and "dl_dst=$MAC_A$, actions=output: EoP." as shown in FIG. 5A. The adjusted inter-rack flow rule and the first relay flow rule may be respectively sent to the host A and the host B in step S330.

In this case, if the host A wants to send the packet P to the host G in rack RK2 (i.e., the source MAC address of the packet P is $MAC_A$ and the destination MAC address is $MAC_G$), the host A will send the packet P via the first port A1 (i.e., the EoP port) to the first port B1 (i.e., the EoP port) of the host B (i.e., the first relay host). Based on the first rule in the first relay flow rule, when the host B receives the packet P, the packet P is sent via the second port B2 to the NIC of the PCIe switch 120a, such that the packet P may be forwarded to the second port G2 of the host G via the NIC of the PCIe switch 120a, the Ethernet switch 130, and NIC of the PCIe switch 120b in sequence. The transmission path of the packet P can be illustrated as a transmission path 599a.

In addition, for the hosts E, F, and G in the rack RK2, since the second port A2 of the host A cannot be used to receive packets transmitted via inter-rack communications due to the failure, the processor 112 may also modify, in step S320, the inter-rack flow rules of the hosts E, F, and G to be "dl_dst=$MAC_A$, actions=output: Eth, to $MAC_B$" as shown in FIG. 5A, and the adjusted inter-rack flow rule can be sent to the hosts E, F, G in step S330. In this case, if the hosts E, F, and G want to send a packet to the host A (that is, the destination host MAC address of the packet is $MAC_A$), the hosts E, F, and G will send the packet via its Eth. port to the NIC of the PCIe switch 120b, such that the packet may be forwarded to the second port B2 of the host B (i.e., the first relay host) through the NIC of the PCIe switch 120b, the Ethernet switch 130, and the NIC of the PCIe switch 120a in sequence.

Then, based on the second rule in the first relay flow rule, when the host B receives the packet whose MAC address of the destination host is $MAC_A$, the packet is sent to the first port A1 (i.e., the EoP port) of the host A via the first port B1 (i.e., the EoP port).

Figure 5B:
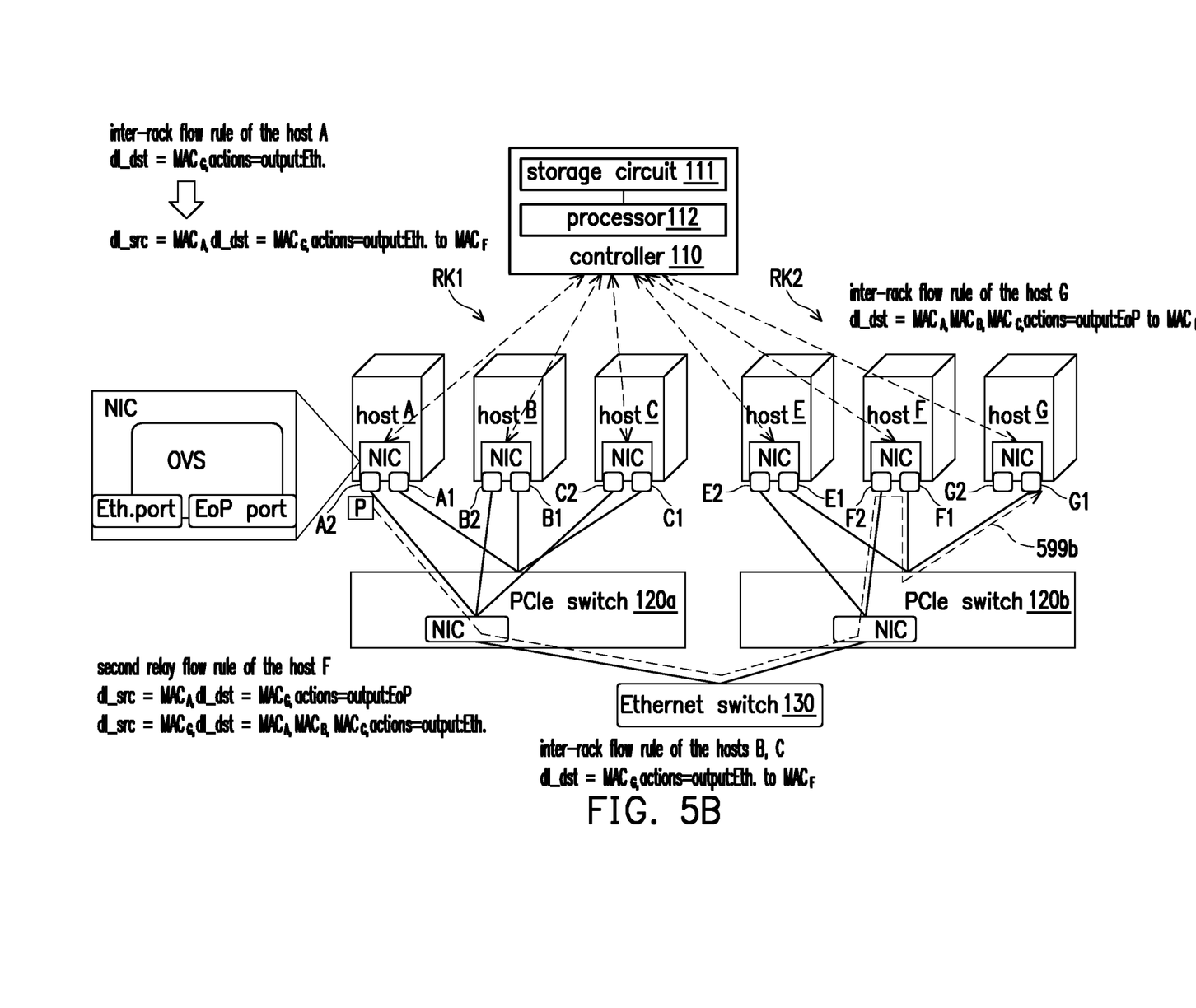
FIG. 5B is a schematic diagram of adjusting inter-rack flow rules when the second port of the receiving host fails according to FIG. 2.

Please refer to FIG. 5B, which is a schematic diagram of adjusting inter-rack flow rules when the second port of the receiving host fails according to FIG. 2. In this embodiment, assuming that the second port G2 (i.e., the Eth. port) of the host G fails, the controller 110 can learn from the information reported by the host G by performing step S310 of FIG. 3. Accordingly, the processor 112 may perform step S320 to adjust the packet flow rules of the hosts A, B, C in the rack RK1 and the hosts E, F, and G in the rack RK2.

Specifically, since the second port G2 of the host G is no longer available for inter-rack communication, the processor 112 can select the first relay host from among the hosts E, F also located in the rack RK2. In one embodiment, the processor 112 may select any of the hosts E and F as the first relay host, wherein the first port and the second port of the first relay host need to be normally functioned. In another embodiment, the processor 112 may select one of the hosts E, F having the minimum load and/or the minimum transmission delay as the first relay host, but the disclosure is not limited thereto. Next, the processor 112 may set a first relay flow rule for the first relay host to assist the host G to perform inter-rack communication with any host in the rack RK1.

Afterwards, the processor 112 can modify the inter-rack flow rule of the host G and the inter-rack flow rule of any host in the rack RK1 to respectively control the host G and any host in the rack RK1 according to the inter-rack flow rule of the host G and the inter-rack flow rule of any host in the rack RK2 under the assistance of the first relay host using the first relay flow rule.

For ease of the following discussions, it is assumed that the host F is selected as the first relay host, but the disclosure is not limited thereto. Based on this, the processor 112 can modify, in step S320, the inter-rack flow rule "dl_dst=$MAC_G$, actions=output: Eth." originally stored in the host A to be "dl_src=$MAC_A$, dl_dst=$MAC_G$, actions=output:Eth, to $MAC_F$" as shown in FIG. 5B and modify the first relay flow rule of the first relay host (i.e., the host F) to be "dl_src=$MAC_A$, dl_dst=$MAC_G$, actions=output: EoP." and "dl_src=$MAC_G$, dl_dst=$MAC_A$, $MAC_B$, $MAC_C$, actions=output: Eth." as shown in FIG. 5B. The adjusted inter-rack flow rule and the first relay flow rule may be respectively sent to the hosts A and F in step S330.

In this case, if the host A wants to send the packet P to the host G in rack RK2 (i.e., the source MAC address of packet P is $MAC_A$ and the destination MAC address is $MAC_G$), the host A will send the packet P via the second port A2 (i.e., the Eth. port) to the NIC of the PCIe switch 120a, such that the packet P may be forwarded to the second port F2 of the host F (i.e., the first relay host) the NIC of the PCIe switch 120a, the Ethernet switch 130, and the NIC of the PCIe switch 120b in sequence. Thereafter, based on the first rule in the first relay flow rule, the host F will send the packet P via the first port F1 (i.e., the EoP port) to the PCIe switch 120b, such that the packet P may be forwarded to the first port G1 of the host G through the PCIe switch 120b. The transmission path of the packet P can be illustrated as a transmission path 599b.

In addition, for the hosts B and C of the rack RK1, since the second port G2 of the host G cannot be used to receive packets transmitted via the inter-rack communications due to the failure, the processor 112 may also modify, in step S320, the inter-rack flow rules of the hosts B, C to be "dl_dst=$MAC_G$, actions=output: Eth, to $MAC_F$" as shown in FIG. 5B, and the adjusted inter-rack flow rule can be transmitted to the hosts B, C in step S330. In this case, if the hosts B and C want to send the packet to the host G (that is, the destination MAC address of the packet is $MAC_G$), the hosts B and C will send the packet by its Eth. port to the NIC of the PCIe switch 120a, such that the packet may be forwarded to the second port F2 of the host F (i.e., the first relay host) via the NIC of the PCIe switch 120a, the Ethernet switch 130, and the NIC of the PCIe switch 120b in sequence. Then, the host F can send the packet to the first port G1 (i.e., the EoP port) of the host G via the first port F1 (i.e., the EoP port).

In addition, the processor 112 may also modify, in step S320, the inter-rack flow rule of the host G to be "dl_dst=$MAC_A$, $MAC_B$, $MAC_C$, actions=output: EoP to $MAC_F$" as shown in FIG. 5B, and may send the adjusted inter-rack flow rule to the host G in step S330.

In this case, if the host G wants to send a packet to the host A, B or C in the rack RK1 (i.e., the source MAC address of the packet P is $MAC_G$ and the destination MAC address is $MAC_A$, $MAC_B$ or $MAC_C$), the host G will send the packet via the first port G1 (i.e., the EoP port) to the first port F1 (i.e., the EoP port) of the host F.

Then, based on the second rule in the first relay flow rule, when the host F receives the packet whose source MAC address is the $MAC_G$, the packet is sent via the second port F2 (i.e., the Eth. port) to the Eth. port of the hosts A, B, or C.

Figure 5C:
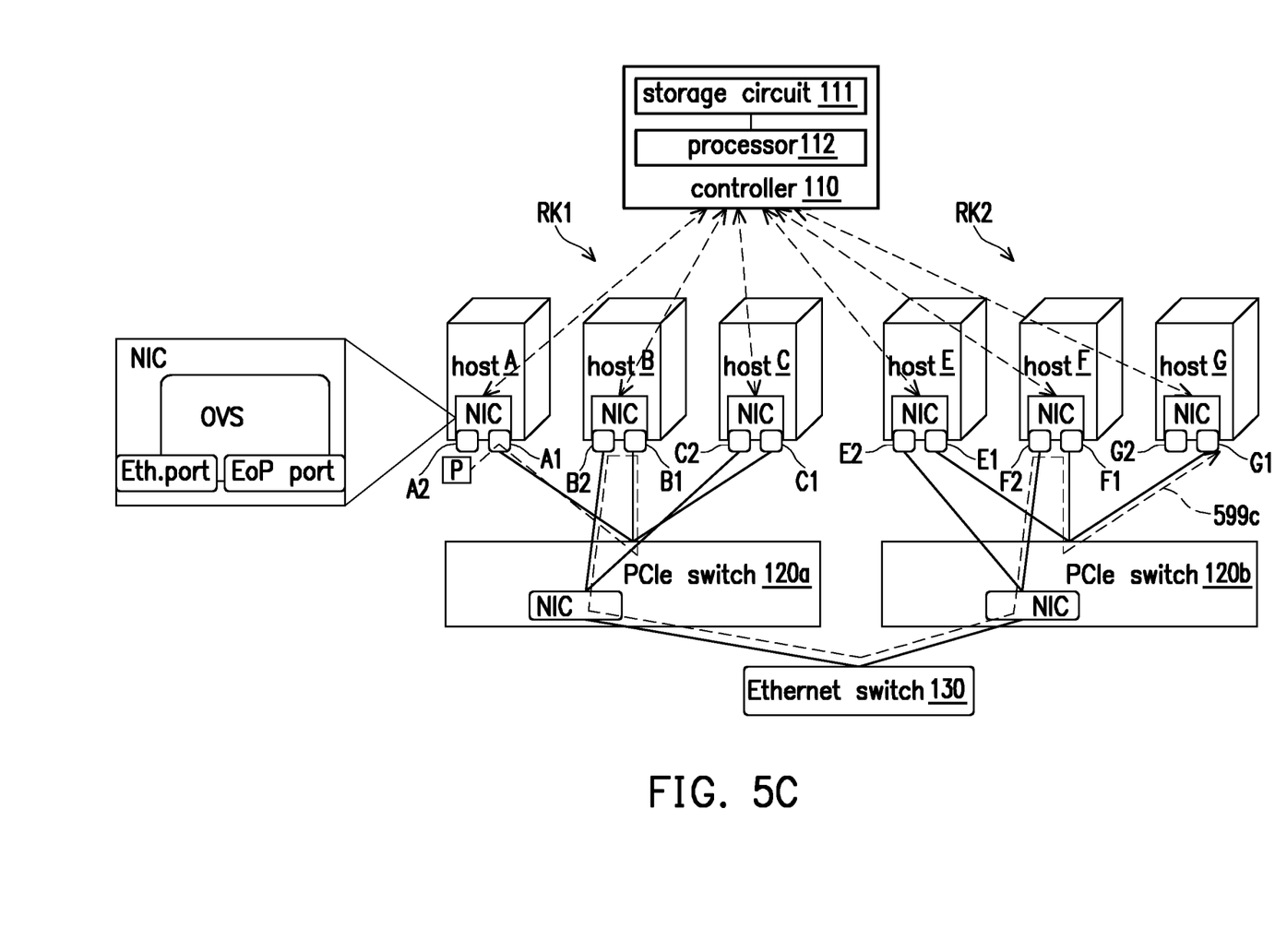
FIG. 5C is a schematic diagram of adjusting inter-rack flow rules when both of the second port of the transmitting host and the first port of the receiving host fail according to FIG. 2.

Please refer to FIG. 5C, which is a schematic diagram of adjusting inter-rack flow rules when both of the second port of the transmitting host and the first port of the receiving host fail according to FIG. 2. In this embodiment, assuming that both of the second port A2 (i.e., the Eth. port) of the host A and the first port G1 (i.e., the EoP port) of the host G fail, the controller 110 can accordingly learn from the information reported by the hosts A and G by performing step S310 in FIG. 3. Accordingly, the processor 112 may perform step S320 to adjust the packet flow rules of the hosts A, B, C in the rack RK1 and the hosts E, F, and G in the rack RK2.

The embodiment of FIG. 5C can be regarded as a combination of the embodiments of FIG. 5A and FIG. 5B. Therefore, the related inter-rack flow rules and the adjustment method of the relay flow rule can be referred to the related descriptions of FIG. 5A and FIG. 5B, and details would not be repeated herein. After the packet flow rules of each of the hosts in FIG. 5C is adjusted according to the descriptions of FIG. 5A and FIG. 5B, if the host A wants to send the packet P to the host G, the packet P can be transmitted to the host G through the transmission path 599c as exemplarily shown in FIG. 5C.

Figure 5D:
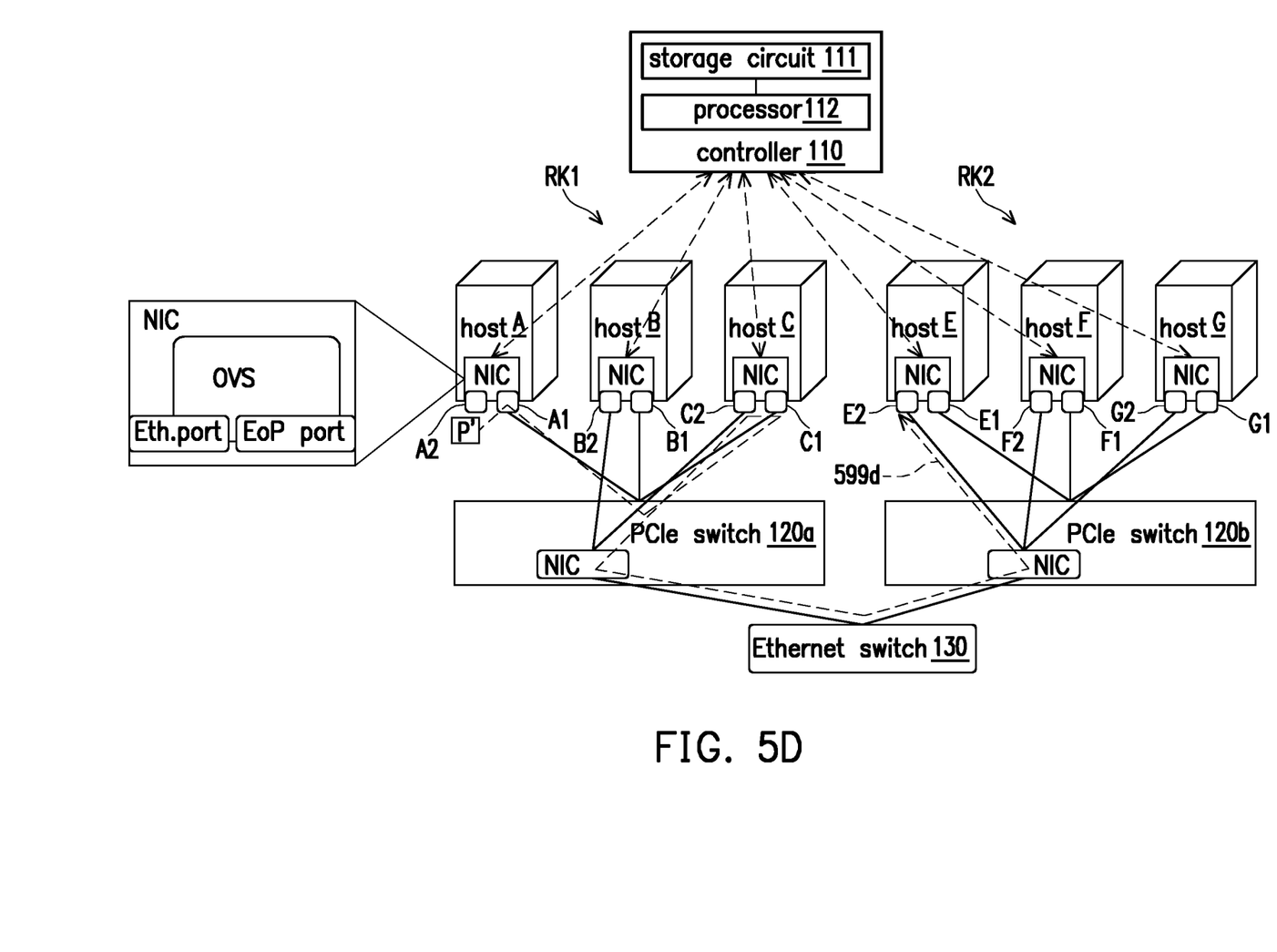
FIG. 5D is a schematic diagram of adjusting inter-rack flow rules when the second port of the transmitting host fails according to FIG. 5A.

Please refer to FIG. 5D, which is a schematic diagram of adjusting inter-rack flow rules when the second port of the transmitting host fails according to FIG. 5A. In the present embodiment, the assumed scenario is the same as that of FIG. 5A. The only difference between FIG. 5A and FIG. 5D is that, in the embodiment of FIG. 5D, if the second port A2 (i.e., the Eth. port) of the host A fails, except for selecting the host B as the first relay host to assist in transmitting the packet P (as shown in FIG. 5A), the controller 110 may also select the host C also located in the rack RK1 as the second relay host. Moreover, the controller 110 can also set a second relay flow rule that the second relay host (i.e., the host C) assists the host A to perform inter-rack communication any host in the rack RK2. Afterwards, the controller 110 can modify the inter-rack flow rule of the host A and the inter-rack flow rule of any host in the rack RK2 to respectively control the host A and any host in the rack RK2 to perform the inter-rack communication according to the inter-rack flow rule of the host A and the inter-rack flow rule of any host in the rack RK2 under the assistance of the first relay host using the first relay flow rule and the second relay host using the second relay flow rule.

As shown in FIG. 5D, when the host A wants to transmit the packet P' to the host E located in the rack RK2, the second relay host (i.e., the host C) can assist in the inter-rack communication, and the transmission path 599d of the packet P' is also shown in FIG. 5D for reference. The related settings of the inter-rack flow rules and the second relay flow rule may be correspondingly derived with reference to the related descriptions of FIG. 5A to FIG. 5C, and details would not be repeated herein.

It can be known from the above teachings that when the second port (i.e., the Eth. port) preset for inter-rack communication in a certain host fails, the controller 110 can select a relay host in the same rack and correspondingly modify the packet flow rules of the aforementioned host, relay host, and other hosts in the same rack/different racks. In this way, the host can normally perform inter-rack communications with other hosts located in other racks with the assistance of the relay host.

In an embodiment, if the first port and the second port of each of the hosts are restored to the normal working state, the controller 110 may correspondingly restore the packet flow rules of each of the hosts to the aspects illustrated in FIG. 1 and FIG. 2. In this way, the hosts in the same rack can directly perform intra-rack communications via the first port (i.e., the EoP port), and the hosts in different racks can directly perform inter-rack communications via the second port (i.e., the Eth. port) without the assistance of relay hosts.

In summary, the method for adjusting the packet flow rule, and the network communication system of the present disclosure allow the controller to know whether there is a first port or a second port of a host cannot be used to transmit/receive packets according to the health status of the first port and the health status of the second port reported by each of the hosts. When the first port (i.e., the EoP port) preset to perform intra-rack communication of a certain host fails, the controller 110 can maintain well-functioned intra-rack communications among the hosts in the same rack by modifying the intra-rack flow rules of all hosts in the rack to instruct all hosts in the rack to perform packet transmissions via the second port (i.e., the Eth. port) of each of the hosts. Moreover, when the second port (i.e., the Eth. port) preset for performing inter-rack communication in a certain host fails, the controller 110 may select a relay host in the same rack, and modify the packet flow rules of the foregoing host, relay hosts and other hosts in the same rack/different racks. In this way, the host can normally perform inter-rack communications with other hosts located in other racks with the assistance of the relay host, and the network communication system can provide high availability (HA) while avoiding broadcast storms.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A controller for a network communication system that combines a peripheral component interconnect express bus with an Ethernet, wherein the network communication system further includes a plurality of hosts, comprising:
   a storage circuit, storing a plurality of modules;
   a processor, coupled to the storage circuit and accessing the modules to perform the following steps:
   receiving a health status of a first port and a health status of a second port of each of the hosts;
   adjusting a packet flow rule of each of the hosts according to the health status of the first port and the health status of the second port of each of the hosts, wherein when the health status of the first port of the first host in the hosts shows that the first port of the first host fails, the processor modifies a first intra-rack flow rule of the first host and a second intra-rack flow rule of a second host to respectively control the first host and the second host to perform an intra-rack communication according to the adjusted first intra-rack flow rule and the adjusted second intra-rack flow rule, wherein the first host and the second host are in the same rack; and transmitting the adjusted packet flow rule of each of the hosts to each of the corresponding hosts to control each of the hosts to transceive a packet according to the corresponding packet flow rule.

2. The controller of claim 1, wherein the first port of each of the hosts is a Peripheral Component Interconnect Express (PCIe) based Ethernet over PCIe, and the second port of each of the hosts is an Ethernet port.

3. The controller of claim 1, wherein the first port of each of the hosts is preset for performing an intra-rack communication, and the second port of each of the hosts is preset for performing an inter-rack communication.

4. The controller of claim 1, wherein the first intra-rack flow rule indicates:

when the first host wants to send a first packet to the second host, instructing the first host to send the first packet to a switch via the second port of the first host to forward the first packet to the second port of the second host via the switch.

5. The controller of claim 4, wherein the second intra-rack flow rule indicates:

when the second host wants to send a second packet to the first host, instructing the second host to send the second packet to the switch via the second port of the second host to forward the second packet to the second port of the first host via the switch.

6. A controller for a network communication system that combines a peripheral component interconnect express bus with an Ethernet, wherein the network communication system further includes a plurality of hosts, comprising:

a storage circuit, storing a plurality of modules;
a processor, coupled to the storage circuit and accessing the modules to perform the following steps:
receiving a health status of a first port and a health status of a second port of each of the hosts;
adjusting a packet flow rule of each of the hosts according to the health status of the first port and the health status of the second port of each of the hosts; and
transmitting the adjusted packet flow rule of each of the hosts to each of the corresponding hosts to control each of the hosts to transceive a packet according to the corresponding packet flow rule, wherein when the health status of the second port of a first host of the hosts shows that the second port of the first host fails, the processor is configured to:
select a first relay host from the hosts, wherein the first relay host and the first host are both located in a first rack;
set a first relay flow rule for the first relay host to assist the first host to perform a first inter-rack communication with a second host, wherein the second host is located in a second rack;
modify a first inter-rack flow rule of the first host and a second inter-rack flow rule of the second host to respectively control the first host and the second host to perform the first inter-rack communication according to the first inter-rack flow rule and the second inter-rack flow rule under the assistance of the first relay host using the first relay flow rule.

7. The controller of claim 6, wherein the first inter-rack flow rule indicates:

when the first host wants to send a first packet to the second host, instructing the first host to send the first packet to a first switch via the first port of the first host to forward the first packet to the first port of the first relay host via the first switch.

8. The controller of claim 7, wherein the first relay flow rule indicates:

when the first packet is received from the first host, and a destination of the first packet is the second host, sending the first packet to the first switch via the second port of the first relay host to forward the first packet to the second host via the first switch, an Ethernet switch, and a second switch in sequence.

9. The controller of claim 6, wherein the second inter-rack flow rule indicates:

when the second host wants to send a second packet to the first host, instructing the second host to send the second packet to a second switch via the second port of the second host to forward the second packet to the second port of the first relay host via the second switch, an Ethernet switch, and a first switch in sequence.

10. The controller of claim 9, wherein the first relay flow rule indicates:

when the second packet is received from the second host, and a destination of the second packet is the first host, sending the second packet to the first switch via the first port of the first relay host to forward the second packet to the first host through the first switch.

11. The controller of claim 6, wherein the processor is further configured to:

select a second relay host from the hosts, wherein the second relay host is located in the first rack;
set a second relay flow rule that the second relay host assists the first host to perform a second inter-rack communication with a third host, wherein the third host and the first host are located in different racks;
modify the first inter-rack flow rule of the first host, and a third inter-rack flow rule of the third host, to respectively control the first host and the third host to perform the second inter-rack communication under the assistance of the second relay host using the second relay flow rule.

12. The controller of claim 6, wherein the first relay host has a minimum load or a fastest transfer speed among the hosts located in the first rack.

13. The controller of claim 6, wherein the first port and the second port of the first relay host are normally functioned.

14. The controller of claim 6, wherein when the health status of the second port of a first host of the hosts shows the second port of the first host fails, and the health status of the first port of a second host of the hosts shows the first port of the second host fails, the processor is configured to:

select the first relay host and a second relay host from the hosts, wherein the first relay host and the first host are both located in the first rack, the second relay host and the second host are both located in the second rack;
set the first relay flow rule that the first relay host assists the first host to perform the inter-rack communication with the second host;
set a second relay flow rule that the second relay host assists the first host and the second host to perform the inter-rack communication;
modify the first inter-rack flow rule of the first host, and the second inter-rack flow rule of the second host, to respectively control the first host and the second host to perform the inter-rack communication under the assistance of the first relay host using the first relay flow rule and the second relay host using the second relay flow rule.

15. A method for adjusting a packet flow rule is applicable to a controller in a network communication system that combines a peripheral component interconnect express bus and an Ethernet, wherein the network communication system further includes a plurality of hosts, and the method comprises:
receiving a health status of a first port and a health status of a second port of each of the hosts;
adjusting a packet flow rule of each of the hosts according to the health status of the first port and the health status of the second port of each of the hosts, comprising:
when the health status of the first port of the first host in the hosts shows that the first port of the first host fails, modifying a first intra-rack flow rule of the first host and a second intra-rack flow rule of a second host to respectively control the first host and the second host to perform an intra-rack communication according to the adjusted first intra-rack flow rule and the adjusted second intra-rack flow rule, wherein the first host and the second host are in the same rack; and
transmitting the adjusted packet flow rule of each of the hosts to each of the corresponding hosts to control each of the hosts to transceive a packet according to the corresponding packet flow rule.

16. The method of claim 15, wherein the first port of each of the hosts is a Peripheral Component Interconnect Express (PCIe) based Ethernet over PCIe, and the second port of each of the hosts is an Ethernet port.

17. The method of claim 15, wherein the first port of each of the hosts is preset for performing an intra-rack communication, and the second port of each of the hosts is preset for performing an inter-rack communication.

18. The method of claim 15, wherein the first intra-rack flow rule indicates:
when the first host wants to send a first packet to the second host, instructing the first host to send the first packet to a switch via the second port of the first host to forward the first packet to the second port of the second host via the switch.

19. The method of claim 18, wherein the second intra-rack flow rule indicates:
when the second host wants to send a second packet to the first host, instructing the second host to send the second packet to the switch via the second port of the second host to forward the second packet to the second port of the first host via the switch.

20. A method for adjusting a packet flow rule is applicable to a controller in a network communication system that combines a peripheral component interconnect express bus and an Ethernet, wherein the network communication system further includes a plurality of hosts, and the method comprises:
receiving a health status of a first port and a health status of a second port of each of the hosts;
adjusting a packet flow rule of each of the hosts according to the health status of the first port and the health status of the second port of each of the hosts; and
transmitting the adjusted packet flow rule of each of the hosts to each of the corresponding hosts to control each of the hosts to transceive a packet according to the corresponding packet flow rule, wherein when the health status of the second one of a first hosts of the hosts indicates the second fault of the first host, the step of adjusting the packet flow rule of each of the hosts according to the health status of the first port and the health status of the second port of each of the hosts comprises:
selecting a first relay host from the hosts, wherein the first relay host and the first host are both located in a first rack;
setting a first relay flow rule for the first relay host to assist the first host to perform a first inter-rack communication with a second host, wherein the second host is located in a second rack;
modifying a first inter-rack flow rule of the first host and a second inter-rack flow rule of the second host to respectively control the first host and the second host to perform the first inter-rack communication according to the first inter-rack flow rule and the second inter-rack flow rule under the assistance of the first relay host using the first relay flow rule.

21. The method of claim 20, wherein the first inter-rack flow rule indicates:
when the first host wants to send a first packet to the second host, instructing the first host to send the first packet to a first switch via the first port of the first host to forward the first packet to the first port of the first relay host via the first switch.

22. The method of claim 21, wherein the first relay flow rule indicates:
when the first packet is received from the first host, and a destination of the first packet is the second host, sending the first packet to the first switch via the second port of the first relay host to forward the first packet to the second host via the first switch, an Ethernet switch, and a second switch in sequence.

23. The method of claim 20, wherein the second inter-rack flow rule indicates:
when the second host wants to send a second packet to the first host, instructing the second host to send the second packet to a second switch via the second port of the second host to forward the second packet to the second port of the first relay host via the second switch, an Ethernet switch, and a first switch in sequence.

24. The method of claim 23, wherein the first relay flow rule indicates:
when the second packet is received from the second host, and a destination of the second packet is the first host, sending the second packet to the first switch via the first port of the first relay host to forward the second packet to the first host through the first switch.

25. The method of claim 20, further comprising:
selecting a second relay host from the hosts, wherein the second relay host is located in the first rack;
setting a second relay flow rule that the second relay host assists the first host to perform a second inter-rack communication with a third host, wherein the third host and the first host are located in different racks;
modifying the first inter-rack flow rule of the first host, and a third inter-rack flow rule of the third host, to respectively control the first host and the third host to perform the second inter-rack communication under the assistance of the second relay host using the second relay flow rule.

26. The method of claim 20, wherein the first relay host has a minimum load or a fastest transfer speed among the hosts located in the first rack.

27. The method of claim 20, wherein the first port and the second port of the first relay host are normally functioned.

28. The method of claim 20, wherein when the health status of the second port of a first host of the hosts shows the second port of the first host fails, and the health status of the first port of a second host of the hosts shows the first port of the second host fails, the step of adjusting the packet flow rule of each of the hosts according to the health status of the first port and the health status of the second port of each of the hosts comprises:
- selecting the first relay host and a second relay host from the hosts, wherein the first relay host and the first host are both located in the first rack, the second relay host and the second host are both located in the second rack;
- setting the first relay flow rule that the first relay host assists the first host to perform the inter-rack communication with the second host;
- setting a second relay flow rule that the second relay host assists the first host and the second host to perform the inter-rack communication;
- modifying the first inter-rack flow rule of the first host, and the second inter-rack flow rule of the second host, to respectively control the first host and the second host to perform the inter-rack communication under the assistance of the first relay host using the first relay flow rule and the second relay host using the second relay flow rule.

29. A network communication system suitable for combining a peripheral component interconnect express bus with an Ethernet, comprising:
- a plurality of hosts;
- a controller, configured to:
- receive a health status of a first port and a health status of a second port of each of the hosts;
- adjust a packet flow rule of each of the hosts according to the health status of the first port and the health status of the second port of each of the hosts, wherein when the health status of the first port of the first host in the hosts shows that the first port of the first host fails, the controller modifies a first intra-rack flow rule of the first host and a second intra-rack flow rule of a second host to respectively control the first host and the second host to perform an intra-rack communication according to the adjusted first intra-rack flow rule and the adjusted second intra-rack flow rule, wherein the first host and the second host are in the same rack; and
- transmit the adjusted packet flow rule of each of the hosts to each of the corresponding hosts to control each of the hosts to transceive a packet according to the corresponding packet flow rules.

30. A network communication system suitable for combining a peripheral component interconnect express bus with an Ethernet, comprising:
- a plurality of hosts;
- a controller, configured to:
- receive a health status of a first port and a health status of a second port of each of the hosts;
- adjust a packet flow rule of each of the hosts according to the health status of the first port and the health status of the second port of each of the hosts; and
- transmit the adjusted packet flow rule of each of the hosts to each of the corresponding hosts to control each of the hosts to transceive a packet according to the corresponding packet flow rules, wherein when the health status of the second port of a first host of the hosts shows that the second port of the first host fails, the controller is configured to:
- select a first relay host from the hosts, wherein the first relay host and the first host are both located in a first rack;
- set a first relay flow rule for the first relay host to assist the first host to perform a first inter-rack communication with a second host, wherein the second host is located in a second rack;
- modify a first inter-rack flow rule of the first host and a second inter-rack flow rule of the second host to respectively control the first host and the second host to perform the first inter-rack communication according to the first inter-rack flow rule and the second inter-rack flow rule under the assistance of the first relay host using the first relay flow rule.

* * * * *